3,361,823
18-NOR-B-NORANDROSTA-4,13-DIENES
Kenneth G. Holden, Stratford, N.J., assignor to Smith Kline & French Laboratories, Philadelphia, Pa., a corporation of Pennsylvania
No Drawing. Filed Sept. 22, 1964, Ser. No. 398,377
3 Claims. (Cl. 260—586)

The present invention relates to 18-nor-B-norandrosta-4,13-dienes having antiandrogenic activity. In particular, the invention relates to 17α-lower alkyl-17β-methyl-18-nor-B-norandrosta-4,13-dien-3-ones.

The compounds of the invention may be represented by the following structural formula:

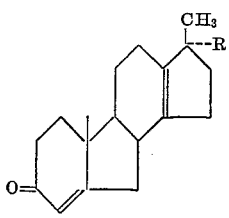

where R is methyl or ethyl.

The compounds of the invention may be prepared by subjecting a 17α-lower alkyl-B-nortestosterone to the action of a strong mineral or organic acid in order to effect a Wagner-Meerwein rearrangement. Preferred conditions for the reaction consist of refluxing the starting compound for a period of a few hours with p-toluenesulfonic acid in benzene. Alternatively one can reflux the starting compound in acetic acid saturated with dry hydrogen chloride. The product is then isolated by conventional extraction procedures and purified by chromatography and recrystallization.

When a solution of 17α-methyl-B-nortestosterone in benzene containing p-toluenesulfonic acid is refluxed for three hours, the resulting product is 17,17-dimethyl-B-norandrosta-4,13-diene-3-one. This compound possesses antiandrogenic activity and is thus useful in instances where it is desired to eliminate or mitigate the effects of excess androgens.

The 17α-lower alkyl-B-nortestosterone starting materials for this invention are described in U.S. Patent No. 3,072,681.

It will be obvious to a chemist skilled in the art of organic chemistry that certain simple derivatives can be prepared from the compounds of this invention. Such derivatives involve the 3-keto group and include ketals, enol ethers, enol acetates. Such derivatives are prepared by conventional procedures and are the full equivalents of the compounds specifically claimed.

It is also obvious that, in place of the 17α-methyl and ethyl groups in the starting material, there can be propyl and butyl groups. The products will correspondingly bear the propyl and butyl groups in the 17α-position and are the full equivalents of the methyl and ethyl compounds.

The following examples illustrate the manner and process of preparing the compounds of the invention, but are to be considered only as illustrative and not limitative thereof.

EXAMPLE 1

*17,17-dimethyl-B-norandrosta-4,13-dien-3-one*

A solution of 6.0 g. of 17α-methyl-B-nortestosterone (U.S. Patent No. 3,072,681) in 600 ml. of benzene containing 1.1 g. of p-toluenesulfonic acid is refluxed for 3 hours in a nitrogen atmosphere. The reaction mixture is then cooled, washed with aqueous sodium bicarbonate solution, dried, and evaporated. The residue is chromatographed over silica gel and recrystallized from methanol to obtain the product, M.P. 96–103° C.

EXAMPLE 2

*17α-ethyl-17β-methyl-B-norandrosta-4,13-dien-3-one*

A solution of 6.0 g. of 17α-ethyl-B-nortestosterone in 600 ml. of benzene containing 1.1 g. of p-toluenesulfonic acid is refluxed for 3 hours in a nitrogen atmosphere. The reaction mixture is then cooled, washed with aqueous sodium bicarbonate solution, dried, and evaporated. The residue is purified by chromatography over silica gel and then recrystallized to obtain the title product.

I claim:
1. A compound of the structure:

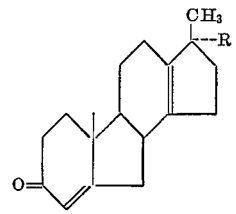

wherein R is selected from the group consisting of methyl and ethyl.
2. 17,17 - dimethyl-18-nor-B-norandrosta-4,13-dien-3-one.
3. 17α - ethyl - 17β-methyl-18-nor-B-norandrosta-4,13-dien-3-one.

References Cited

Sondheimer et al., "J. American Chem. Soc.," vol. 77, pp. 4145 to 4149 (1955).

LEON ZITVER, *Primary Examiner.*
M. JACOB, *Assistant Examiner.*